(12) United States Patent
Aaby et al.

(10) Patent No.: US 8,146,123 B2
(45) Date of Patent: Mar. 27, 2012

(54) SYSTEM TO PROVIDE SET TOP BOX CONFIGURATION FOR CONTENT ON DEMAND

(75) Inventors: Cliff Aaby, Vancouver, WA (US); Christian J. Parker, Louisville, CO (US)

(73) Assignee: ARRIS Group, Inc., Suwanee, GA (US)

( * ) Notice: Subject to any disclaimer, the term of this patent is extended or adjusted under 35 U.S.C. 154(b) by 933 days.

(21) Appl. No.: 10/579,097

(22) PCT Filed: Nov. 12, 2004

(86) PCT No.: PCT/US2004/038657
§ 371 (c)(1),
(2), (4) Date: May 18, 2007

(87) PCT Pub. No.: WO2005/050974
PCT Pub. Date: Jun. 2, 2005

(65) Prior Publication Data
US 2007/0261089 A1    Nov. 8, 2007

Related U.S. Application Data

(60) Provisional application No. 60/520,359, filed on Nov. 13, 2003.

(51) Int. Cl.
*H04N 7/173* (2006.01)
*H04N 7/16* (2006.01)

(52) U.S. Cl. ............ 725/91; 725/98; 725/100; 725/114; 725/119; 725/131; 725/144; 725/151

(58) Field of Classification Search ............... 725/87, 725/91, 98, 100, 103, 114, 118, 119, 131, 725/144, 151
See application file for complete search history.

(56) References Cited

U.S. PATENT DOCUMENTS

| | | | |
|---|---|---|---|
| 5,544,161 A | | 8/1996 | Bigham et al. |
| 5,666,293 A | * | 9/1997 | Metz et al. ................... 709/220 |
| 5,784,464 A | * | 7/1998 | Akiyama et al. .............. 713/155 |
| 6,513,069 B1 | * | 1/2003 | Abato et al. .................. 709/238 |
| 6,532,591 B1 | * | 3/2003 | Arai et al. ..................... 725/132 |
| 6,697,376 B1 | * | 2/2004 | Son et al. ...................... 370/465 |
| 7,089,577 B1 | * | 8/2006 | Rakib et al. .................... 725/87 |
| 7,246,366 B1 | * | 7/2007 | Addington et al. ............. 725/93 |
| 7,376,829 B2 | * | 5/2008 | Ranjan ......................... 713/153 |
| 7,720,044 B1 | * | 5/2010 | Rainisto ....................... 370/349 |
| 8,032,910 B2 | * | 10/2011 | Lewis et al. ................... 725/68 |
| 8,037,504 B2 | * | 10/2011 | Jerding et al. ................. 725/91 |

(Continued)

FOREIGN PATENT DOCUMENTS
WO    WO 95/15658 A    8/1995
(Continued)

OTHER PUBLICATIONS

EP Search report for EP 04811384.9, mailed on Feb. 12, 2009.
(Continued)

*Primary Examiner* — Brian Pendleton
*Assistant Examiner* — Pinkal R Chokshi
(74) *Attorney, Agent, or Firm* — Troy A. Van Aacken; Robert J. Starr

(57) ABSTRACT

A content on demand system includes logic to compose set top box configuration information into an audio and/or video stream format, and to communicate the configuration information to a plurality of set top boxes.

8 Claims, 8 Drawing Sheets

U.S. PATENT DOCUMENTS

| | | | |
|---|---|---|---|
| 2002/0059619 A1* | 5/2002 | Lebar | 725/87 |
| 2003/0139980 A1* | 7/2003 | Hamilton | 705/27 |
| 2004/0117839 A1* | 6/2004 | Watson et al. | 725/87 |
| 2004/0133907 A1* | 7/2004 | Rodriguez et al. | 725/14 |
| 2005/0091699 A1* | 4/2005 | Poli et al. | 725/132 |
| 2005/0198686 A1* | 9/2005 | Krause et al. | 725/118 |
| 2006/0271973 A1* | 11/2006 | Jerding et al. | 725/86 |
| 2007/0130583 A1* | 6/2007 | Thiagarajan et al. | 725/37 |
| 2007/0220580 A1* | 9/2007 | Putterman et al. | 725/134 |
| 2007/0261089 A1* | 11/2007 | Aaby et al. | 725/100 |

FOREIGN PATENT DOCUMENTS

| | | |
|---|---|---|
| WO | WO 99/57905 A | 11/1999 |
| WO | WO00/78049 A | 12/2000 |
| WO | WO 01/97507 A | 12/2001 |

OTHER PUBLICATIONS

Office Action for EP 04811384.9, mailed on Dec. 3, 2009.

Examination report for EP 04811384.9, mailed on Jun. 3, 2009.

\* cited by examiner

SYSTEM TO PROVIDE SET TOP BOX CONFIGURATION FOR CONTENT ON DEMAND

PRIORITY CLAIM

The present application claims priority to A METHOD AND SCALABLE MECHANISMS FOR EFFICIENT, SCALABLE, AND RELIABLE DELIVERY OF INTERACTIVE PROGRAM DATA, filed on Nov. 13, 2003, and having application No. 60/520,359.

TECHNICAL FIELD

The present disclosure relates to request and delivery of audio and/or video content, and content on demand.

BACKGROUND ART

Several challenges arise when attempting to deliver scalable and reliable content-on-demand. Updated configuration information should be available for the set top boxes that facilitate ordering, receiving, and rendering of the content. Information describing categories of available content, and individual titles, should be made available to the set top boxes in a scalable fashion. The system should also provide mechanisms to facilitate restriction of rated content, and to provide control over navigation of on-demand content.

DISCLOSURE OF INVENTION

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A content on demand system includes logic to compose set top box configuration information into an audio and/or video stream format, and logic to communicate the configuration information to a plurality of set top boxes.

The contenton demand system may include logic to communicate the configuration information to a plurality of service nodes, whereupon the service nodes compose a service group identifier into the audio and/or video stream format, and communicate the configuration information and the service group identifier to a plurality of set top boxes.

A set top box may include logic to tune to a channel comprising configuration information having a streamed audio and/or video format, to read the configuration information, and to store the configuration information in memory. The set top box may tune to a predetermined virtual channel number to retrieve set top box configuration information formatted as an audio and/or video stream, and apply the configuration information to affect operational settings of the set top box.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

INDUSTRIAL APPLICABILITY AND MODES FOR CARRYING OUT THE INVENTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Herein, the term "logic" refers to software (e.g. program instructions) and/or hardware (e.g. circuitry) to carry out processing in a device, such as a computing device, routing/switching device, communication device, or data processing device.

Figure 1:
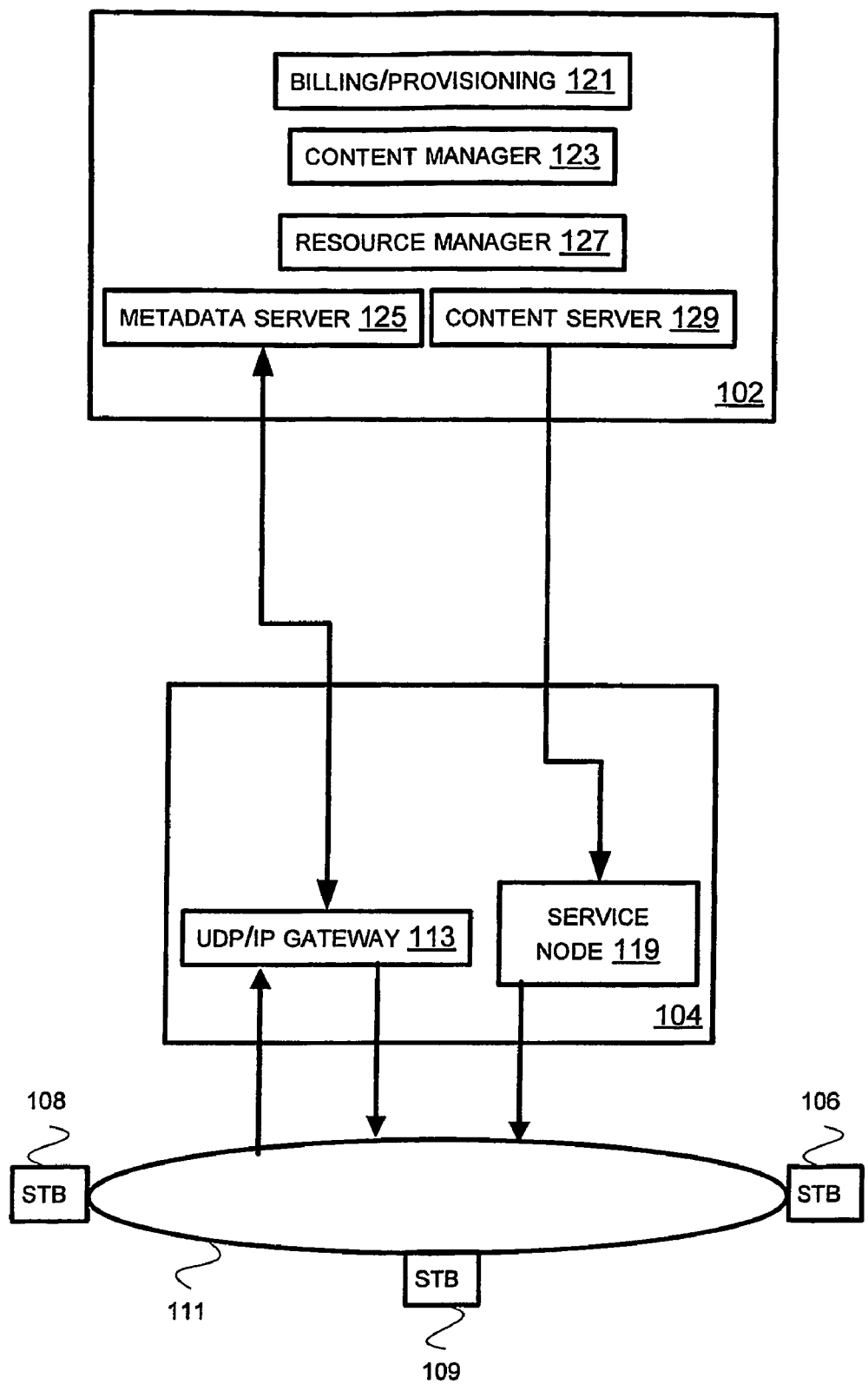
FIG. 1 is a block diagram of an embodiment of a system for providing content-on-demand.

FIG. 1 is a block diagram of an embodiment of a system for providing audio and/or video streams on demand. The content-on-demand server system 102 comprises a content server 129 and a metadata server 125. The content-on-demand server system 102 further comprises a resource manager 127, a content manager 123, and a billing/provisioning function 121.

The system 102 communicates, via a network structure 104, audio and/or video formatted streams to set-top boxes 106, 108, 109. The system 102 and the network structure 104 may be interfaced using Ethernet networking. The streams may comprise on-demand content, such as movies or music. The streams may also comprise configuration and content metadata.

The distribution media 111 provides a shared communication media (such as coaxial cable) for communication to and from the plurality of set-top boxes 106, 108, 109.

The server system 102 may comprise logic to compose set top box configuration information into an audio and/or video stream format (e.g. MPEG-2). Set top box configuration information may include general configuration information (e.g. special-purpose channels, channel names, and IP address and port numbers for communicating with the server system 102), and configuration information that is specific to one or more groups of set top boxes (e.g. local program options).

The server system 102, for example the content manager 123, may also comprise logic to compose information about multiple audio and/or video streams (content metadata) into an audio and/or video stream format. Content metadata may include information about content categories (e.g. horror, documentary, comedy, etc.), and information about audio and/or video titles (e.g. movie titles, movie length, movie description, leading actors, etc., as well as ads, logos, and other graphics.).

The server system 102 may further comprise logic to compose an index of content metadata into an audio and/or video stream format. The index of content metadata may comprise indications of which channels a set top box should tune in order to access content metadata, and locations of the data within those channels. The metadata server 125 receives and responds to requests from the set-top boxes 106, 108, 109 for content streams. The metadata server 125 communicates to the content server 129 information about what to stream to the set-top boxes 106, 108, 109. For example, the metadata server 125 may identify a movie or music file to stream to one or more of the set top boxes 106, 108, 109 in fulfillment of an on-demand content request.

The resource manager 127 provides resource allocation and load balancing for the content-on-demand system 102. The content manager 123 stores information about content offerings, such as category information and information descriptive of content titles (collectively referred to as content metadata). The metadata server 125 may format the content metadata as one or more audio and/or video stream files (e.g. MPEG-2 or another audio and/or video stream format) and provide the files, along with scheduling information, to the content server 129.

The billing/provisioning function 121 provides customer account management, provisioning, and billing. The billing/provisioning function 121 may be notified of content requests received by the metadata server 125.

In one embodiment the network structure 104 comprises, among other things, one or more user datagram protocol/internet protocol (UDP/IP) gateways 113. In some embodiments, other protocols may also be supported. The network structure 104 may also comprise one or more service nodes 119. The UDP/IP gateway 113 provides bidirectional communication for orders, logic updates, and other purposes between set top boxes 106, 108, 109 and the content-on-demand server system 102. The UDP/IP gateway 113 converts between UDP/IP communications, used by the content-on-demand system 102, and quadrature phase-shift keying (QPSK) radio frequency communications, used by the set top boxes 106, 108, 109. Communication between the metadata server 125 and a set top box such as 106, 108, or 109 is always point-to-point, with the particular set top box-such as 106, 108, or 109 being specifically addressed.

The network structure 104 facilitates delivery of content-on-demand between the content-on-demand server system 102 and various set top boxes 106, 108, 109. Service nodes 119 may provide conversion of digital streams to radio frequency (RF) quadrature amplitude modulation (QAM) communication used by cable television systems. The service node 119 may include logic to insert, in the QAM/RF communication from the server system 102 to a set top box, a service group identification (not shown) for the set top boxes 106, 108, 109.

The service node 119 receives the audio/video stream in a format such as MPEG2 over Ethernet. The service node 119 delivers the audio/video stream to the medium used for the set top boxes 106, 108, 109 in a format such as MPEG2 over radio frequency communications. Communication of content-on-demand is provided using broadcast and is one way.

Figure 2:
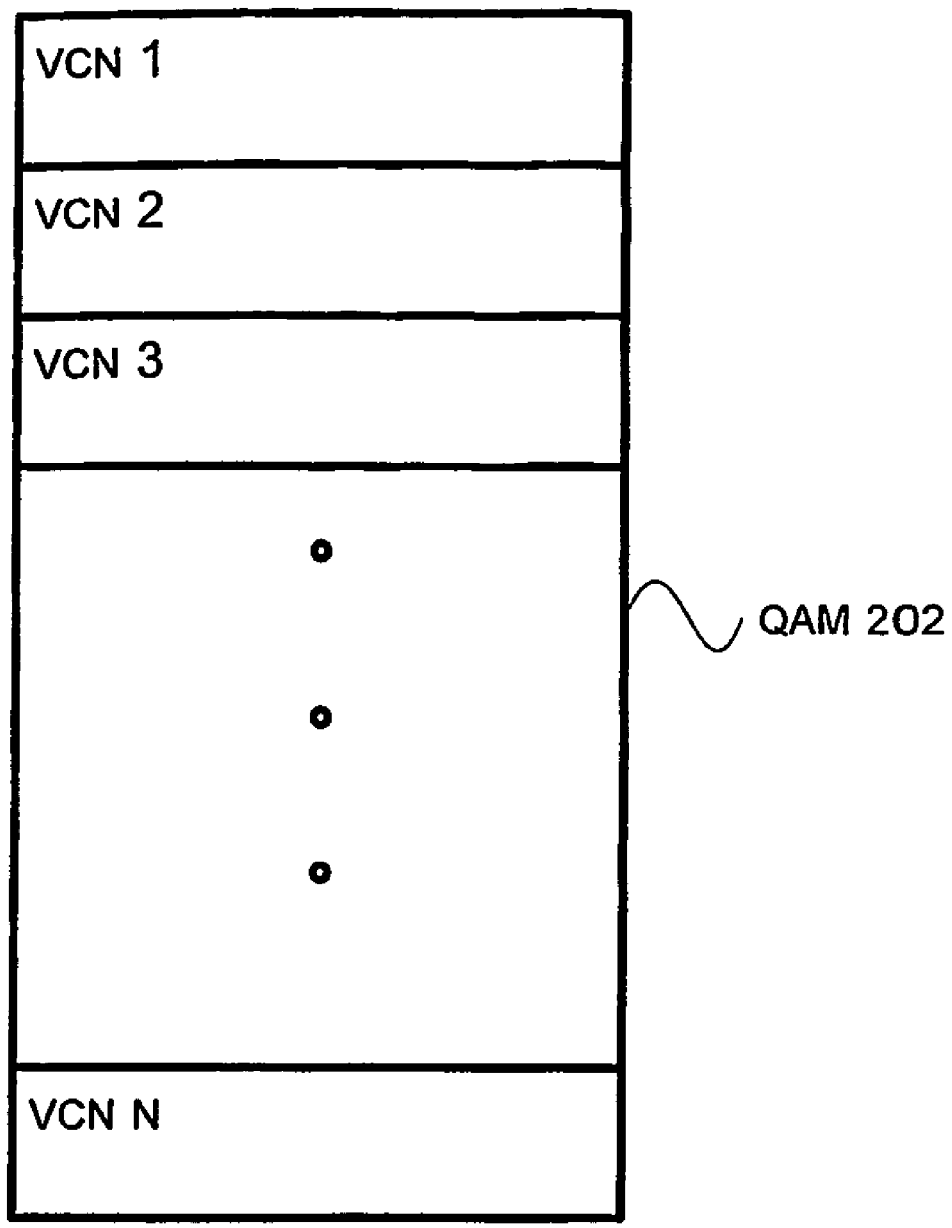
FIG. 2 is a block diagram of an embodiment of a virtual channel group embodied within a quadrature amplitude modulation frequency segment.

FIG. 2 is a block diagram of an embodiment of a virtual channel group embodied within a quadrature amplitude modulation (QAM) frequency segment. The spectrum of the QAM 202 is allocated to a virtual channel group (VCN) VCN 1–VCN N. Each virtual channel within the group is allocated a portion of the frequency spectrum of the QAM 202.

A set top box can tune to a particular channel in order to access information of the channel. A channel may comprise an audio and/or video stream, configuration information for the set top box, and/or content metadata or an index thereof.

Figure 3:
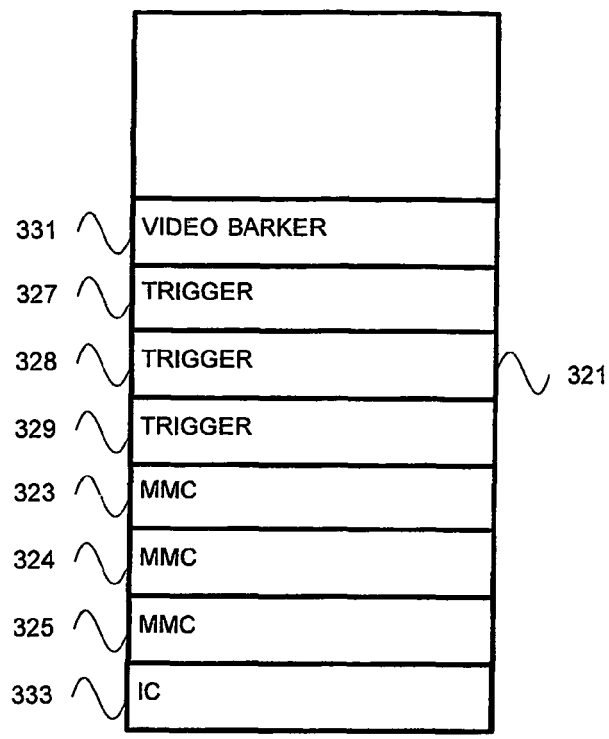
FIG. 3 is a block diagram of an embodiment of a virtual channel group, to deliver configuration and content information to a set top box, embodied within a quadrature amplitude modulation frequency segment.

FIG. 3 is a block diagram of an embodiment of a virtual channel group, to deliver configuration and content information to a set top box, embodied within a quadrature amplitude modulation frequency segment 321. Set top box configuration information is provided via an "initialization carousel" (IC) 333 on a predetermined channel.

Figure 4:
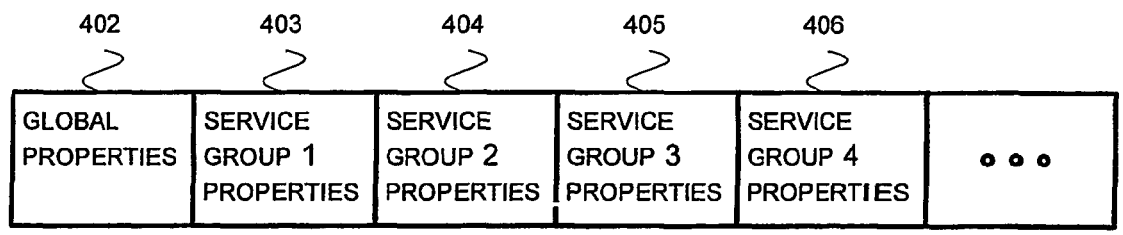
FIG. 4 is a block diagram of an embodiment of a broadcast initialization carousel.

FIG. 4 is a block diagram of an embodiment of set top box configuration information, such as the IC 333 in FIG. 3. The configuration information, which is typically provided by the content-on-demand server system 102, includes global configuration information 402 that applies to all set top boxes, and settings 403-406 for particular service groups. In one embodiment, the content-on-demand server system 102 may compose set top box configuration information expressed in Extensible Markup Language into an audio and/or video stream format.

A set top box may include logic to tune to a channel comprising the configuration information in streamed audio and/or video format, to read the configuration information, and to store the configuration information in memory. The set top box logic may check a version of the configuration information, and when the version does not match a version of configuration information stored in memory, the set top box may store the configuration information to memory. In other words, the set top box may replace obsolete configuration information in memory with more up to data configuration memory from the continuously-streaming initialization carousel.

A set top box may include logic to locate a service group identifier in the QAM 321, and to apply the service group identifier to locate configuration information 403-406 specific to set top boxes belonging to the service group.

Content metadata and an index thereof may be provided via metadata channels (MMC) 323-325. In one embodiment, the content-on-demand server system 102 may compose content metadata and/or an index thereof expressed in Extensible Markup Language into an audio and/or video stream format (one or more streams).

Alternative metadata channels 327-329 (triggers) may provide an alternative source of the metadata and/or index.

To receive on-demand content, a set top box may tune to a channel 333 comprising set top box configuration information having a streamed audio and/or video format. The set top box may locate among the configuration information a service group identifier for the set top box, and a channel 325 and an alternate channel 329 from which to retrieve a content index, the content index also having a streamed audio and/or video format. The set top box may then tune to the content index channel 325 and retrieve the content index. When the channel from which to retrieve the content index comprises an indication of invalid data (e.g. a predetermined bit pattern indicating invalid data in the channel), the set top box may tune to the alternate channel 329 for the content index. In this manner, the content index may be continually streamed via the channel 325, and when the data in the index becomes obsolete, the information of the channel 325 may be set to indicate invalid data. The set top box then tunes to the alternate channel 329 for the content index.

QAM virtual channels (323-329, 331, 333) can also include one or more video barkers 331.

Figure 5:
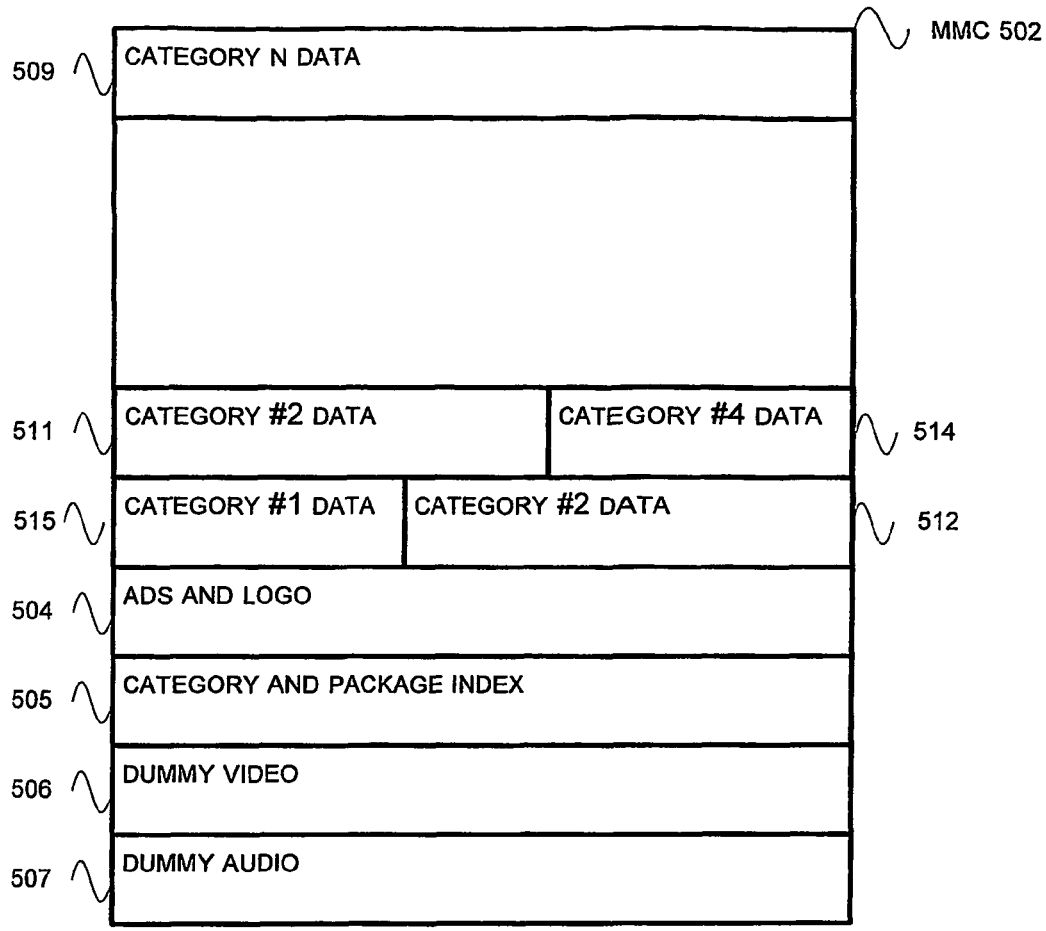
FIG. 5 is a block diagram of an embodiment of a channel comprising a content index and/or a category index.

FIG. 5 is a block diagram of an embodiment of a metadata channel 502 comprising a content index 505. The content index 505 may comprise an index of content category metadata, and an index of "package" metadata, e.g. metadata for individual content titles. This index 505 may be applied by the set top box to generate a visual guide and/or menu of available content.

In one embodiment the channel 502 may be organized into MPEG packet identifiers (PIDs), and the PIDs themselves organized into sections or segments. The channel 502 may include audio and video-type information (507 and 506, respectively) to facilitate tuning by the set top box. The channel 502 may include one or more advertisements and logos 504 to display with the content guide that is presented to users of the set top box.

In one embodiment, the channel 502 may also comprise content category metadata 509, 511, 512, 514, 515. Content category metadata 509, 511, 512, 514, 515 comprises information about categories of content such as adult, science fiction, horror, documentary, and so on.

A set top box may locate in the content index a channel comprising audio and/or video title information (e.g. a content title metadata such as 323 or 324 in FIG. 3), and tune to the channel comprising the title metadata. The set top box may locate the audio and/or video title information in the channel, and apply at least a portion of the title metadata and the service group identifier in a request for content communicated to the server system. The server system may respond by communicating to the set top box a stream comprising the requested title.

When the channel comprising the content title metadata instead comprises an indication of invalid data (e.g. a trigger), the set top box may tune to an alternate channel (e.g. channels 327 or 328 in FIG. 3) comprising the title metadata. In this manner, the title metadata may be continually streamed via the channels 323-324, and when the title metadata becomes obsolete, the information of the channel 323 or 324 may be set to indicate invalid data, to cause the set top box to tune to the alternate channel comprising up-to-date title metadata.

Thus, the content-on-demand server system may include logic to alternatively deliver content metadata on at least one first tunable channel and on at least one alternate tunable channel. Likewise, the server system may include logic to alternatively deliver an index of content metadata on a first tunable channel and on an alternate tunable channel. In this manner, updates to the content metadata and index may be accomplished without interruption or loss of information.

In addition, to provide control over navigation and presentation of streamed content, the server system may include logic to insert markers in communicated audio and/or video streams. The meaning of the markers may vary. Some markers may indicate a position in the stream. Some markers may indicate a rating of content of the stream proximate to a position of the marker, typically following the marker.

Figure 6:
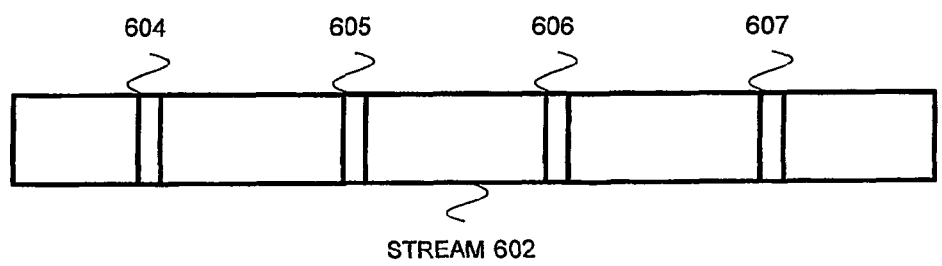
FIG. 6 is a block diagram of an embodiment of a stream including markers.

FIG. 6 is a block diagram of an embodiment of an audio and/or video stream 602 including markers 604-607. A predetermined number of markers may be inserted in each time interval of the stream. This number may be provided with the set top box configuration information.

One example of the use of stream markers is for pausing and resuming delivery of on-demand content. A set top box may communicate to the content-on-demand server system a marker for an audio and/or video stream for which the set top box has suspended viewing. The server system may then suspend delivery of the stream. Upon a later signal from the set top box, the server system may resume streaming of the audio and/or video stream from a position proximate to the marker.

Some markers may indicate the proximity of advertisements in a stream. Logic of the set top box and/or server system may prevent certain navigation functions in the vicinity of advertisements, such as fast-forwarding past the advertisements. The markers also provide a mechanism whereby set-top boxes my detect the end of an audio and/or video stream, and/or loss of stream content.

Some markers may indicate the proximity of rated content. Logic of the set top box and/or server system may inhibit rendering (e.g. prevent viewing or hearing) of the rated content, or warn of the presence of the rated content, under certain circumstances, such as when the content has a mature rating.

Figure 7:
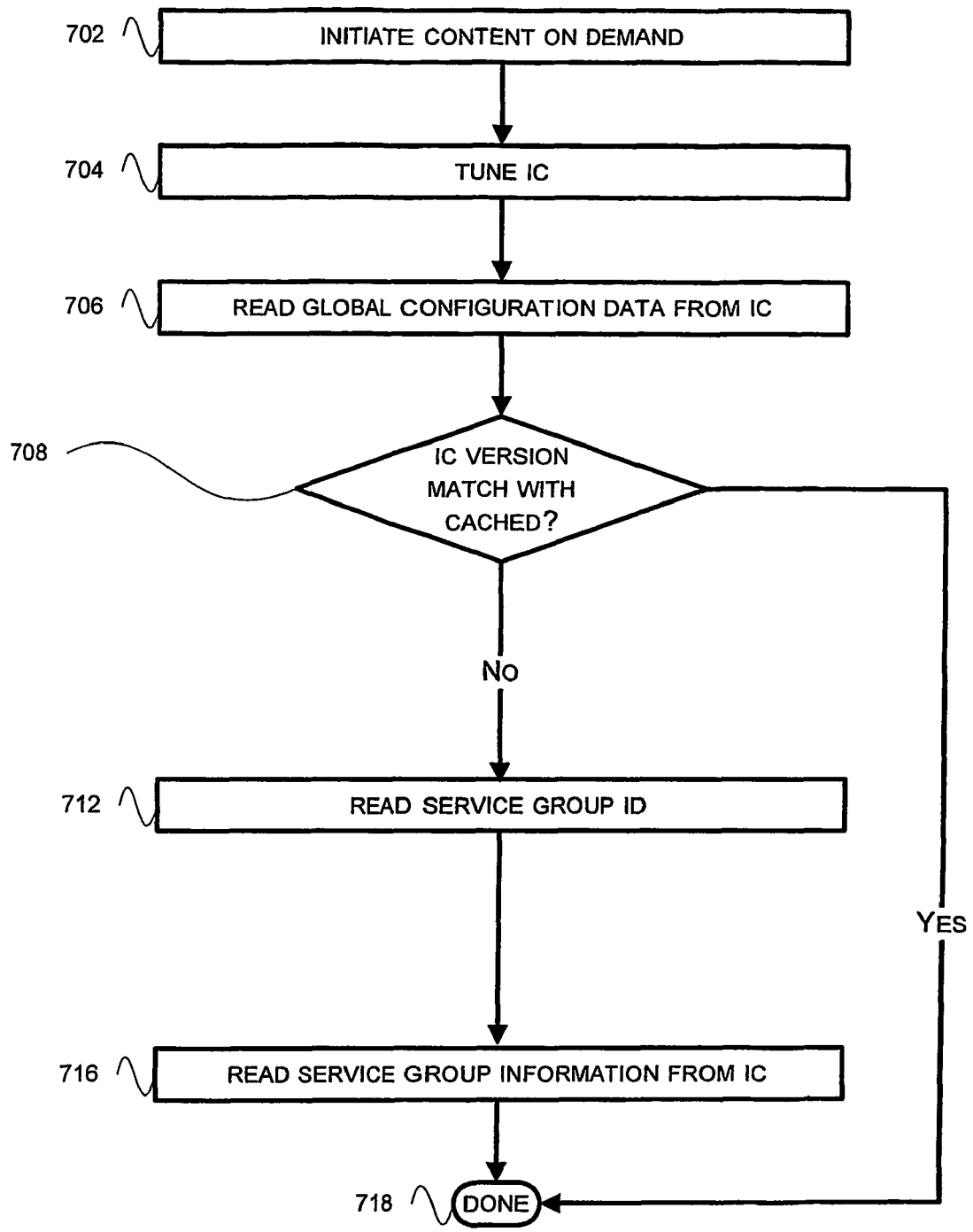
FIG. 7 is a flow chart of an embodiment of a process of initializing a set top box for content on demand.

FIG. 7 is a flow chart of an embodiment of an initialization of a set top box for video-on-demand. At 702 a content-on-demand feature of a set top box is initiated. The set top box tunes to the initialization carousel channel at 704. Global configuration data for the set top box is read from the initialization carousel at 706. At 708, if the version of the configuration information matches the version of cached information, the process concludes at 718. Otherwise, a service group identifier for the set top box is extracted from the QAM at 712. Service group-specific information is then read from the initialization carousel at 716.

Thus, a set top box may include logic to tune to a predetermined virtual channel number to retrieve set top box configuration information formatted as an audio and/or video stream.

The set top box may include logic to apply the configuration information to affect operational settings of a set top box, when a version of the configuration information differs from a version of configuration information previously applied.

The set top box may include logic to apply general configuration information to affect general operational settings of the set top box, and logic to locate a service group identifier for the set top box and to apply the service group identifier to locate service group specific configuration information for the set top box. The service group specific configuration information may also be formatted as an audio and/or video stream.

Figure 8:
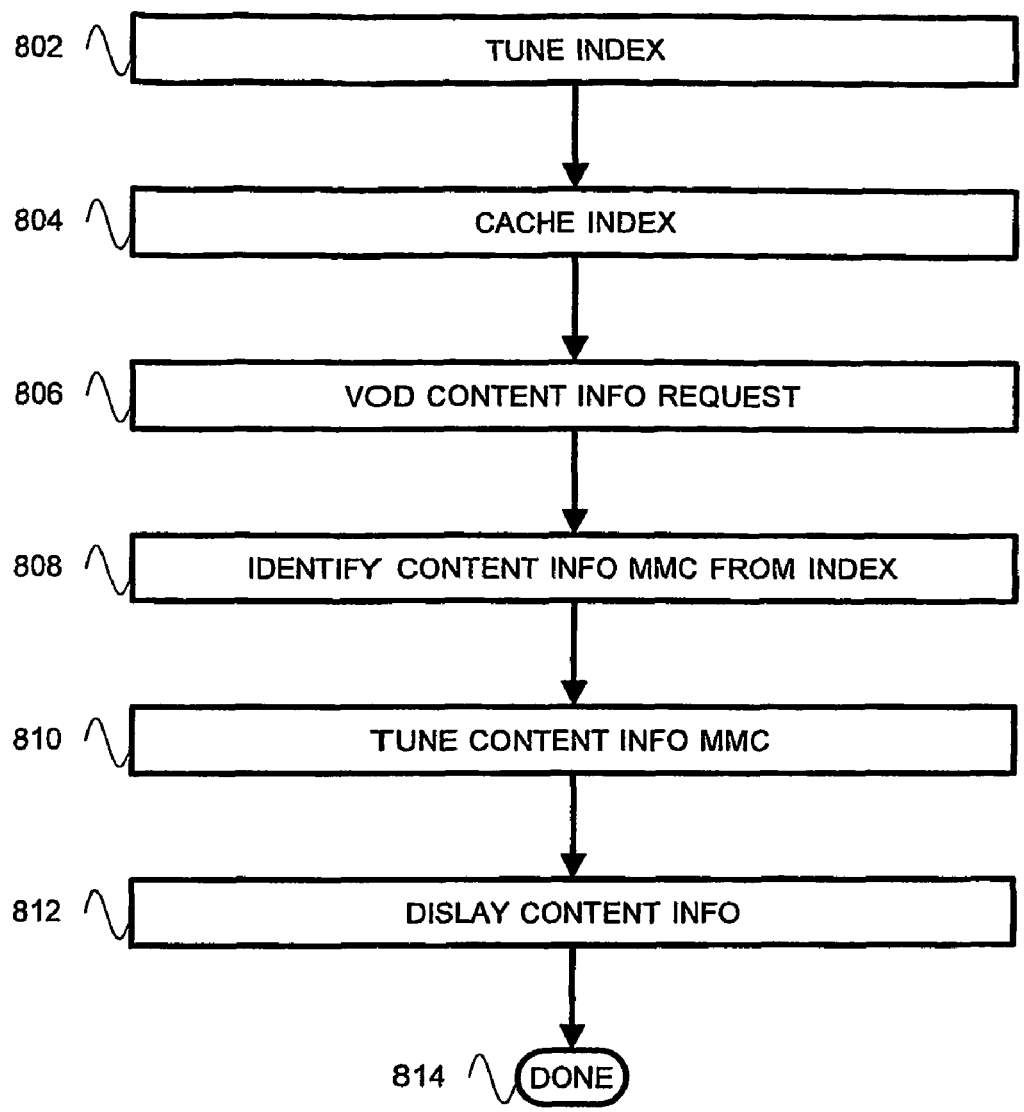
FIG. 8 is a flow chart of an embodiment of a set top box displaying information about available content.

FIG. 8 is a flow chart of an embodiment of a process by which a set top box may display information about available audio and/or video streams.

At 802 the set top box tunes to a channel comprising a content index, the content index formatted as streamed audio and/or video information. The index information is cached to a memory of the set top box at 804. At 806 a user of the set top box makes a request for content information, for example, by initiating a request to view details about an available on-demand movie. At 808 a channel comprising the content metadata is identified from the index. The set top box tunes to the channel comprising the content metadata at 810. At 812 the requested content information is displayed.

Figure 9:
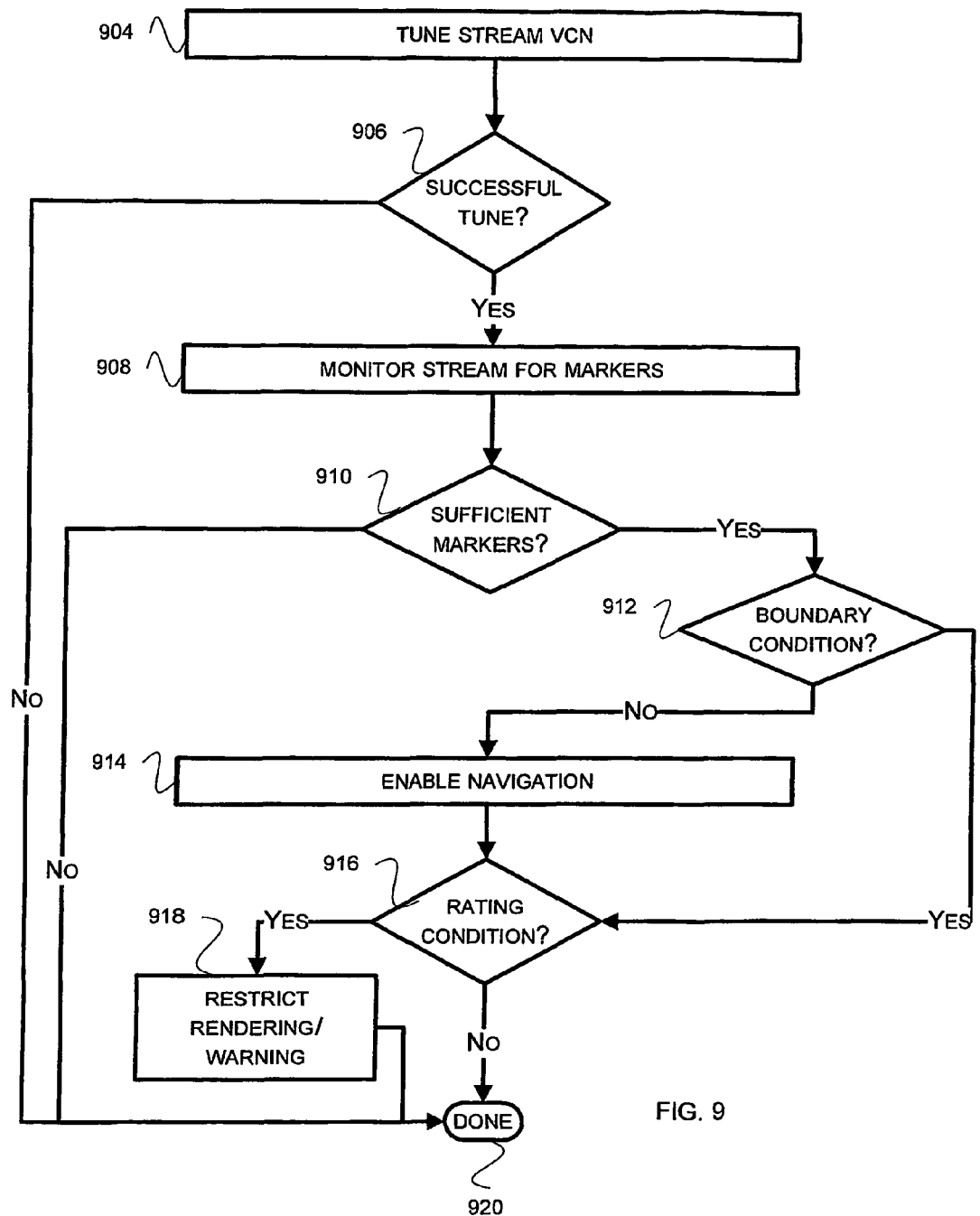
FIG. 9 is a flow chart of an embodiment of a process of monitoring markers in a stream.

FIG. 9 is a flow chart of an embodiment of monitoring markers in an audio and/or video stream. At 904 the set top box tunes to the channel of the audio and/or video stream. If at 906 the tune is successful, the set top monitors the stream for markers at 908. Otherwise, the process concludes at 920.

If at 910 there are not sufficient markers in a predetermined time interval of the stream, the process concludes and reception and rendering of the stream may be terminated.

Otherwise, a test is made at 912 for certain boundary conditions. Boundary conditions can include, among other things, being close to the end of the stream, or being close to an advertisement. Navigation is enabled at 914 if a boundary condition is not detected. A check is also made at 916 for rating conditions, such as proximity of mature content. If there is a rating condition, rendering of the content is restricted, or a warning provided, at 918.

Thus, a set top box may include logic to scan an audio and/or video stream for markers.

When an insufficient number of markers are detected within a time interval, rendering of the stream may be terminated (for example, by signaling the server system 102 to discontinue streaming of the content).

When one or more markers indicate a restricting condition, rendering and/or navigation of the stream may be inhibited according to the restricting condition.

Inhibiting navigation of the stream may include inhibiting at least one of fast forward, rewind, pausing, skipping, or playing of the stream. Inhibiting rendering of the stream may include inhibiting at least one of viewing or listening of the stream when the rating is mature content.

Rendering and/or navigation of the audio and/or video stream may be re-enabled when another marker indicating an end to the restricting condition is encountered in the stream.

Enabling navigation of the stream may include enabling at least one of fast forward, rewind, pausing, skipping, or playing of the audio and/or video stream. Enabling rendering of the stream may include enabling at least one of viewing or listening of the stream when the rating is no longer mature content.

Figure 10:
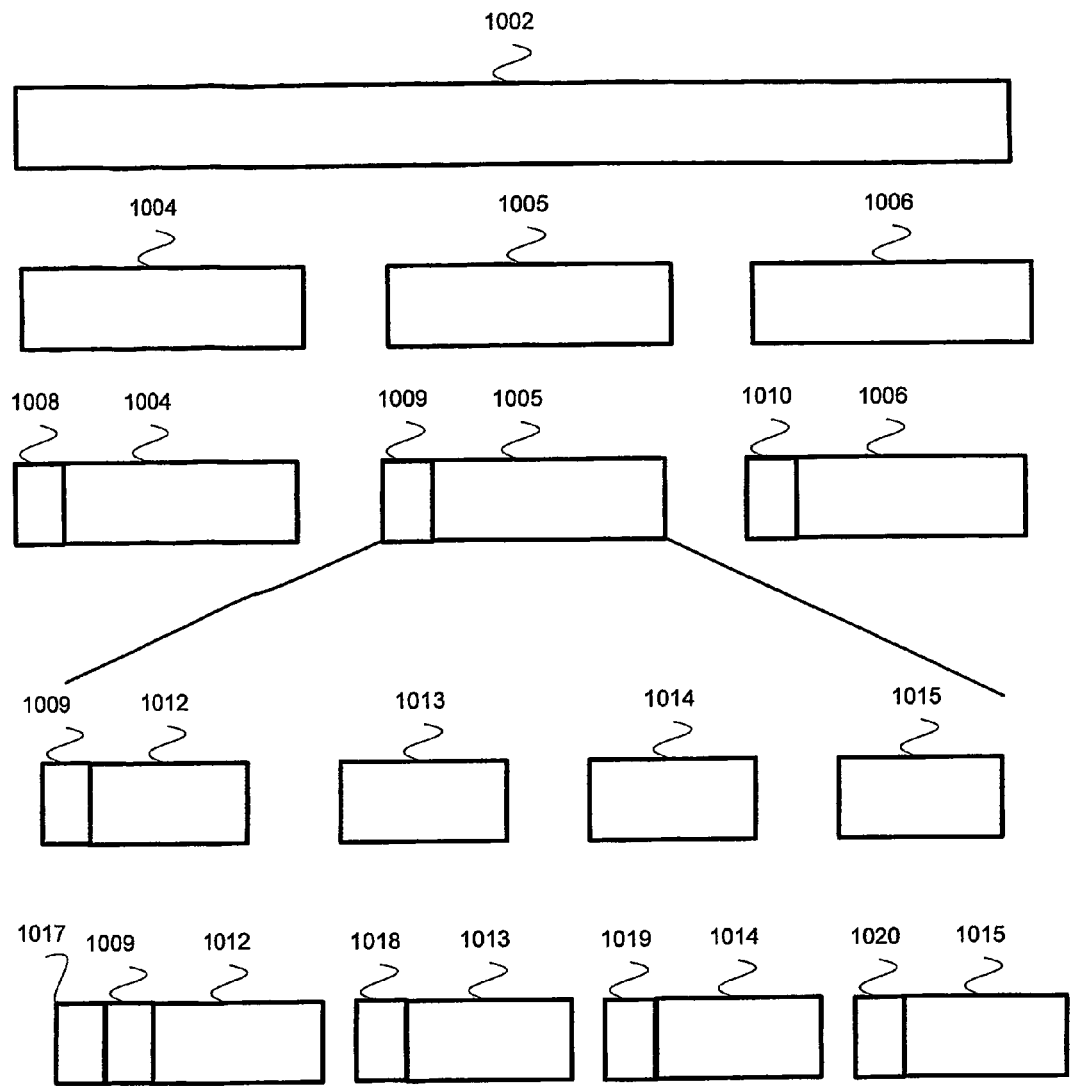
FIG. 10 is a block diagram of an embodiment of a process of information into a format of audio and/or video streams.

FIG. 10 is a block diagram of an embodiment of a manner of composing content metadata 1002 into an audio and/or video stream format, in this case an MPEG-2 format.

The metadata 1002 is divided into smaller objects 1004-1006, and each chunk is provided with an MPEG NC object header 1008-1010. Each object 1004-1006 is further decomposed into segments, such as for object 1005 segments 1012-1015. Each segment is provided with an MPEG NC segment header 1017-1020. Finally, each segment may be decomposed into MPEG transport packets of type DC2Text, MPEG private sections, and/or other packet types supported by the set top box.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A content on demand system comprising:
   a content on demand server system comprising non-transitory machine memory and/or circuits comprising logic to compose set top box configuration information into an audio and/or video stream format, and logic to communicate the configuration information to a plurality of service nodes; and
   a plurality of service nodes each comprising non-transitory machine memory and/or circuits comprising logic to compose a service group identifier into the audio and/or video stream format, and logic to communicate the configuration information and the service group identifier to a plurality of set top boxes;
   non-transitory machine memory and/or circuits comprising logic to receive from a set top box a request for an audio and/or video stream, the request comprising the service group identifier communicated to the set top box and an identifier of a title of the audio and/or video stream, and to provide the audio and/or video stream to a service node corresponding to the service group identifier.

2. The content on demand system of claim 1, wherein the set top box configuration information further comprises:
   general configuration information, and configuration information for one or more groups of set top boxes.

3. The content on demand system of claim 1, wherein the logic to compose set top box configuration information into an audio and/or video stream format further comprises:
   logic to compose set top box configuration information expressed in extensible markup language into the audio and/or video stream format.

4. The content on demand system of claim 3, wherein the set top box configuration information further comprises:
   general configuration information, and configuration information for one or more groups of set top boxes.

5. A content on demand server comprising:
   non-transitory machine memory and/or circuits comprising logic to compose set top box configuration information into an audio and/or video stream format, and logic to communicate the configuration information to a plurality of service nodes; and
   non-transitory machine memory and/or circuits comprising logic to receive from a set top box a request for an audio and/or video stream, the request comprising the service group identifier communicated to the set top box and an identifier of a title of the audio and/or video stream, and to provide the audio and/or video stream to a service node corresponding to the service group identifier.

6. The content on demand server system of claim 5, wherein the set top box configuration information further comprises:
   general configuration information, and configuration information for one or more groups of set top boxes.

7. The content on demand server system of claim 5, wherein the logic to compose set top box configuration information into an audio and/or video stream format further comprises:
   logic to compose set top box configuration information expressed in extensible markup language into the audio and/or video stream format.

8. The content on demand server system of claim 7, wherein the set top box configuration information further comprises:
   general configuration information, and configuration information for one or more groups of set top boxes.

* * * * *